Sept. 6, 1966 H. PETER ETAL 3,271,677
METER MOVEMENT WITH SCALE RANGE INDICATORS ACTUATED BY
PHOTORESPONSIVE SWITCHING CIRCUITS
Filed June 25, 1965 4 Sheets-Sheet 1

INVENTORS
HELMUT PETER AND
GOTTHILF SCHRENK, DECEASED,
By MARIA-LUISE SCHRENK, ADMINISTRATRIX
BY Nolte and Nolte
ATTORNEYS Sept. 6, 1966    H. PETER ETAL    3,271,677
METER MOVEMENT WITH SCALE RANGE INDICATORS ACTUATED BY
PHOTORESPONSIVE SWITCHING CIRCUITS
Filed June 25, 1965    4 Sheets-Sheet 2

INVENTORS
HELMUT PETER AND
GOTTHILF SCHRENK, DECEASED
BY MARIA-LUISE SCHRENK, ADMINISTRATRIX
BY Nolte and Nolte
ATTORNEYS INVENTORS
HELMUT PETER AND
GOTTHILF SCHRENK, DECEASED
By MARIA-LUISE SCHRENK ADMINISTRATRIX
BY Nolte and Nolte
ATTORNEYS United States Patent Office 3,271,677
Patented Sept. 6, 1966

3,271,677
METER MOVEMENT WITH SCALE RANGE INDICATORS ACTUATED BY PHOTORESPONSIVE SWITCHING CIRCUITS
Helmut Peter, 7 Elbestrasse, Erlangen, Germany, and Gotthilf Schrenk, deceased, late of Erlangen, Germany, by Maria-Luise Schrenk geb. Albrecht, executor, 3 Langemarckplatz, Erlangen, Germany, and Hartmut Schrenk, 7 Steinickeweg, Munich 13, Germany; Martin Schrenk, 3 Langemarckplatz, Erlangen, Germany; Monika Schrenk, 30 Dustere Eichen-Weg, Gottingen, Germany; and Friedrich Schrenk and Renate Schrenk, 3 Langemarckplatz, Erlangen, Germany, heirs
Filed June 25, 1965, Ser. No. 467,829
Claims priority, application Germany, Oct. 28, 1959, G 28,251; Nov. 12, 1959, G 28,352
3 Claims. (Cl. 324—96)

This application is a continuation-in-part of co-pending application Serial No. 46,174 filed on July 29, 1960, now abandoned.

The invention pertains to a measuring instrument with photoelectric contacting, to which a switching apparatus is connected as a sequence switch.

The invention provides a photoresponsive contactor, using a band of light as a contactor and a luminous marker, separate from this band, as an indicator. The band of light and the luminous marker are produced by appropriate openings in a common image mask of an optical system and projected together by a mirror moved by the measuring device. The openings in the mask are so positioned that the luminous marker falls on a longitudinal scale, while the band of light falls on an area alongside this scale, on which one or more photoelectric cells are slidable.

Another object of the invention, in connection with this photoresponsive contactor instrument, is a switching apparatus for the photoresponsive contactor instrument, consisting of a series of electromechanical or electronic relays, connected together in a certain manner and connected at one end to the photoresponsive contactor instrument, and at the other to a large-scale indicating device. This switching apparatus indicates on a large-picture projection device the position of the luminous marker on the scale of the photoresponsive contactor instrument.

Another object of the invention is to provide a switching device for use with a photoresponsive contactor instrument which has reliability of operation by means of redundantly connected switches and always provides an indication regardless of the rapidity of the movement of the meter.

Other features and objects of the invention will become apparent from the following description and the accompanying drawings.

In the drawings, wherein similar reference characters denote similar elements throughout the several views.

Figure 1:
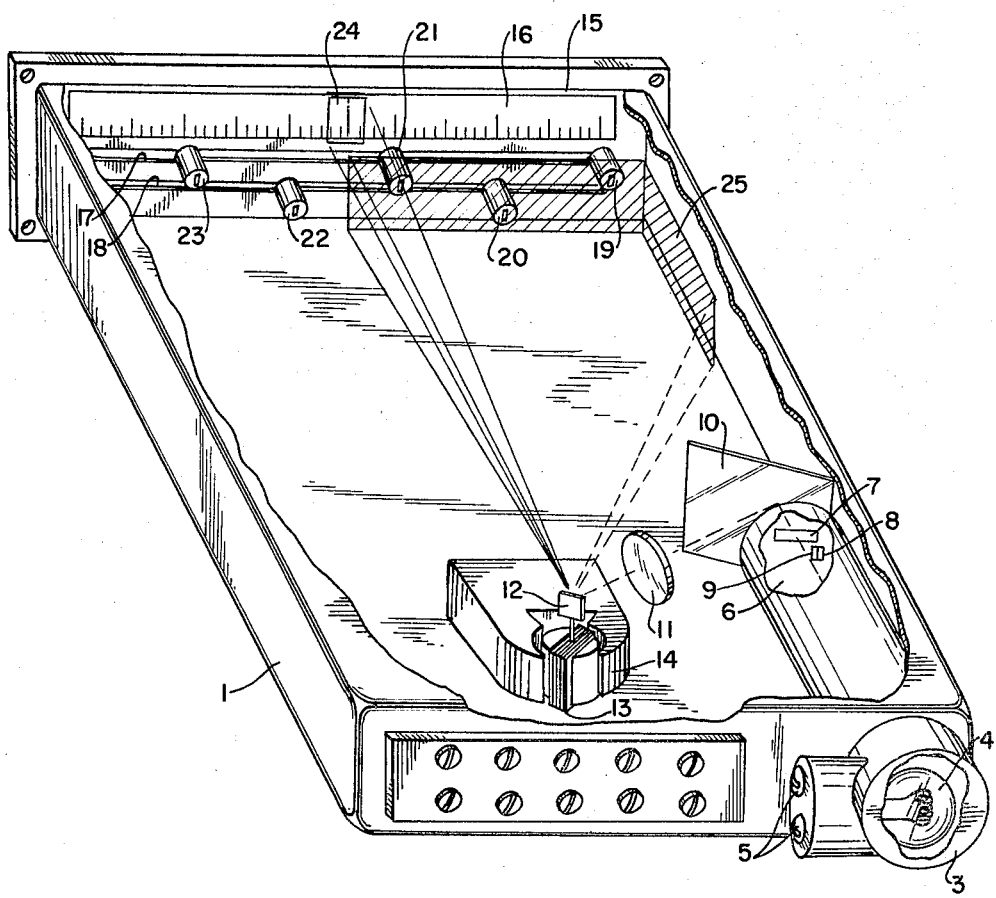
FIG. 1 is a perspective view of the photoresponsive contactor instrument from the rear.

As shown in FIGURE 1, there are a terminal board 2 and a tube 3 mounted at the back of an instrument housing 1, which is shown broken away. Terminal board 2, fitted with five pairs of terminals, serves to make contact with the five photoelectric cells described below. Tube 3 contains inside it a projection device consisting of an incandescent lamp 4 and a conventional optical condenser. The nature of the projection device is known, so that only the incandescent lamp is illustrated. Its terminals 5 are mounted on a lateral projection, serving to connect incandescent lamp 4 to an auxiliary voltage.

Tube 3 is terminated by a mask 6 inside housing 1. This mask is provided with a long, narrow slit 7 and a second opening 8. The latter has a thread 9 stretched across it and constitutes the indicator marker, while slit 7 produces a band of light.

The images of slit 7 and of indicating marker 8 are reflected to a mirror 12 through a rigidly attached deflecting mirror 10 and a likewise stationary projection lens 11. Mirror 12 is attached to the movable system of a measuring device. The measuring device here, for example, is represented as a moving-coil measuring device with a small coil 13 and a magnet 14, and as such is not part of the invention. The meter may be of a different type, depending upon the quantity and nature of what is measured, e.g. a pneumatic measuring device; all that matters is that the indicated values appear as the rotation of a shaft. From the measuring-device mirror 12 the image beam travels as shown to the rear side of the front of instrument housing 1.

The front of the housing is provided with a window 15, in which a transparent scale 16 is set. Two adjacent channels or slits 17 and 18 are fitted beneath this scale in which five photoresponsive cells 19, 20, 21, 22 and 23 are arranged in staggered position.

The photoelectric cells can be moved back and forth in these slits by any suitable means, not shown, and thus fixed in any desired position. Furthermore, they are provided with indicator markers on the front side of the housing, not visible in the drawings, which likewise point to scale 16, and indicate the settings of photoelectric cells 19–23 from the outside. In FIG. 1 these cells are assigned to the scale values 0, 2, 4, 6 and 8. Furthermore, these five photoelectric cells are connected to the five terminal pairs of the terminal board 2, this not being shown here for the sake of clarity.

The position of openings 7 and 8 in mask 6 of tube 3 and the plane in which the beam of light moves are so chosen that the projection of the indicator maker 9 falls on the scale 16, there producing a line marker 24 and indicating the magnitude of the measured value, while a projection 25 of slit 7 falls on the section of the rear side of the front wall that is provided with guide slots 17 and 18 for the photoelectric cells. The center line of marker 24 coincides with the extreme left-hand edge of projected light band 25; they move together, owing to their simultaneous reflection off mirror 12 which rotates with coil 13 of the measuring device.

Now, if moving coil 13 turns, light band 25 travels back and forth along slots 17 and 18 and illuminates some of the photoelectric cells, depending upon the deflection of the measuring device. In the example shown, cells 19, 20 and 21 are illuminated, while the band of light does not strike cells 22 and 23. At the same time, luminous marker 24 moves along scale 16 in unison with band 25, indicating the measured value on the latter.

This construction of the measuring instrument has the significant advantage of having the bank of light and the indicating marker always uniquely and necessarily linked together by the joint projection, so that this measuring and contractor instrument always possesses particularly satisfactory reliability of measurement.

Figure 2:
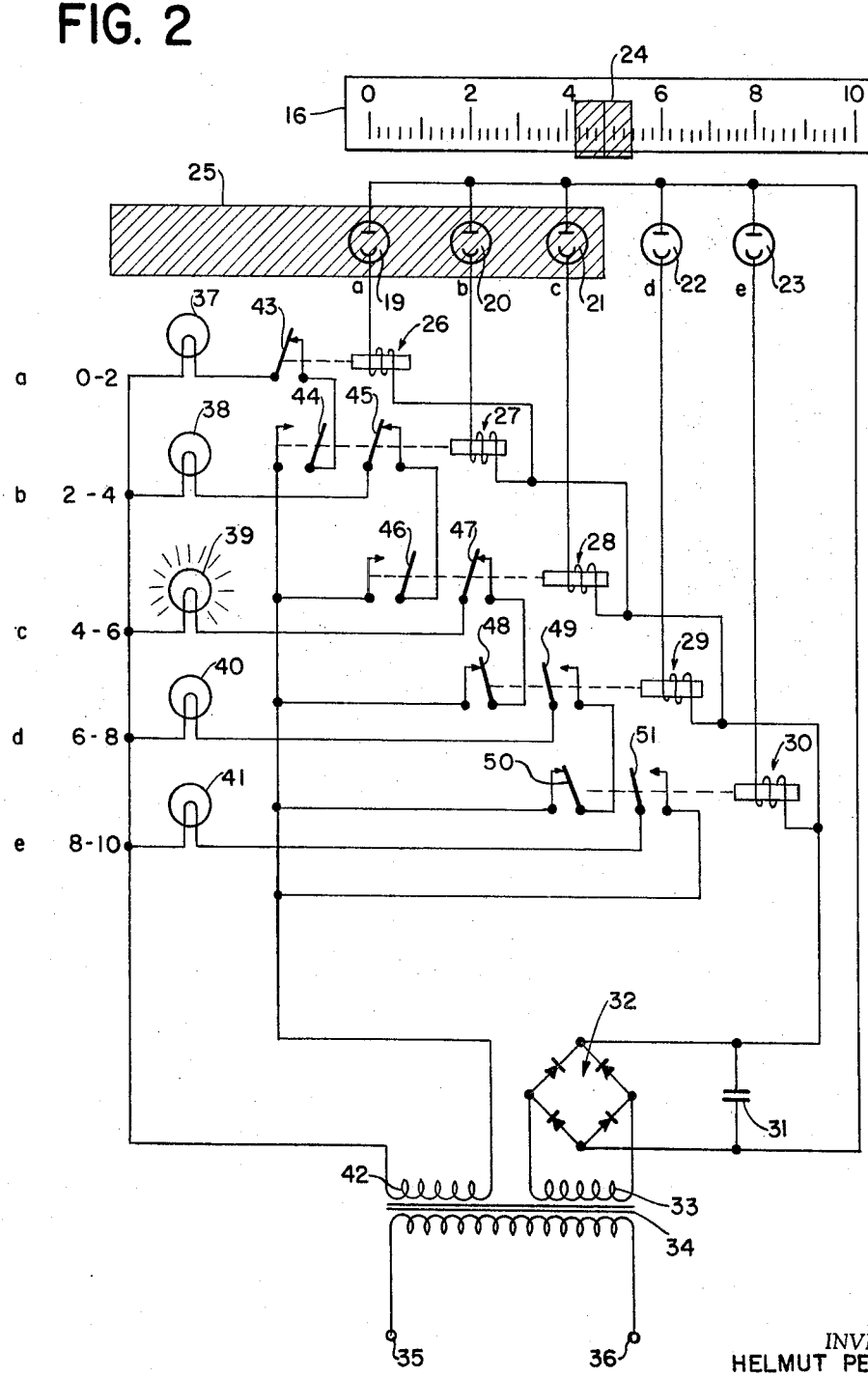
FIG. 2 shows one embodiment of the switching apparatus with electromechanical relays and a large-scale indicating device, employing incandescent lamps.

One embodiment of swicthing apparatus for this lightbang contactor instrument is shown in FIG. 2. As in FIG. 1, the five photoelectric cells are again denoted by 19, 20, 21, 22 and 23, the scale by 16, the luminous marker by 24, and the bank of light by 25. The same notation is employed for these parts in FIGS. 3 and 4, described below.

Sensitive relays 26–30 are connected in series with each photoresistor or photocell 19–23 respectively. All five series circuits are connected in parallel across a charging capacitor 31 of a rectifier 32, which is connected to a secondary winding 33 of a line transformer 34. Terminals 35 and 36 are connected to the A.C. line.

The indicating device consisting of incandescent lamps 37–41 serves as the follow-up element. Each incandescent lamp is assigned to a definite region of the measuring-device; incandescent lamp 38, for example, to the range 2–4. The circuits of the lamp are connected in parallel to another secondary winding 42 of the line transformer 34. Two series circuits are assigned to each incandescent lamp, except the last, consisting of the contacts of two relays which operate in parallel to each other. Thus, for example, contacts 43 and 44 are assigned to the incandescent lamp 37, contacts 45 and 46 to the incandescent lamp 38, contacts 47 and 48 to lamp 39, and contacts 49, and 50 to lamp 40. Only the last incandescent lamp 41 has only one contact 51, because the range of the measuring-device scale indicated by it does not have a photoelectric cell following it.

In accordance with the operation of the switching apparatus in the invention, the contacts are so designed that pairs of them occupy different switching positions when the corresponding photoelectric cells are exposed to identical illumination states. Thus, in the present case, for example, cells 19 and 20 and 21 are illuminated. Accordingly, one of the contacts 43 and 44 assigned to incandescent lamp 37 is closed, namely 43, while the other is open, so that lamp 37 remains off. The same holds true for the contacts 49 and 50, for example, as the photoresistors 22 and 23 are not illuminated.

It follows that the two contacts assigned to one lamp are closed only when the corresponding photoelectric cells exhibit different illumination states. This is always the case only for two certain adjacent photoelectric cells, namely, those between which the edge of light band 25 lies. As seen in FIG. 2, this is the case for cells 21 and 22, so that lamp 39, assigned to range 4–6, is energized and lights up.

It is obvious that shadow band can take the place of light band 25, this shadow band then successively masking normally illuminated photoelectric cells. In that case only, relay 26 would be equipped with a normally close contact, the contacts of the other relays being interchanged. This, however, involves no change in the operating principle.

Figure 3:
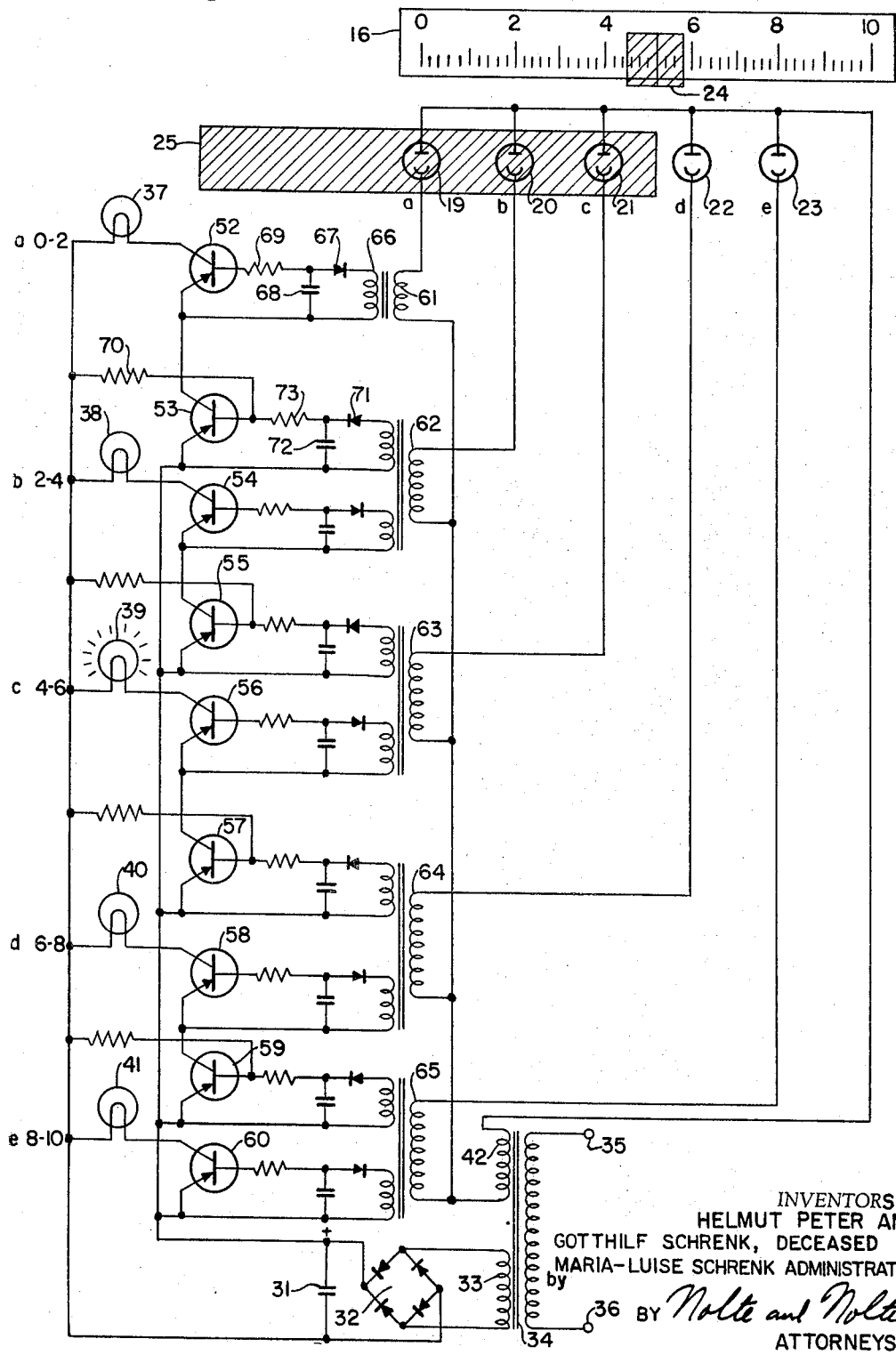
FIG. 3 shows an embodiment of the switching apparatus with electronic relays and likewise with a large scale incandescent-lamp indicating device.

The construction of the embodiment of the switching device shown in FIG. 3 differs from the one just described in that electronic circuit elements that do the same job are used instead of the electromagnetic relays. The circuits of these circuit elements consist of the emitter—collector circuits of transistors 52–60, which are controlled by photoresistors 19–23 through rectifier circuits 67–69, 71–73, etc. and through transformes 61–65. Photoresistors 19–23 are in series with the primary windings of transformers 61–65 respectively and connected directly to winding 42 of line transformer 34. Here, incandescent lamps 37–41 are connected across charging condenser 31 of rectifier 32 through the respective portions of transistor circuits 52–60.

Let us consider transistors 52 and 53 assigned to incandenscent lamp 37 in order to explain the mode of operation of the transistor switch of FIG. 3. As both photoresistors 19 and 20 are illuminated by band of light 25, both transformers 61 and 62 are energized. Rectifier 67 and changing condenser 68 are connected to secondary winding 66 of transformer 61. The polarity of the rectifier is such that the base electrodes of transistor 52 has a negative potential impressed on it through the base series resistor 69, so that the output electrode circuit of this transistor becomes conductive. The other transistor 53 normally receives a negative potential through a resistor 70. But since transformer 62 is also energized, as we have said, the base electrode of transistor 53 has a positive potential impressed on it through rectifier 71, its charging condenser 72, and series resistance 73. This positive potential is so dimensioned as to exceed the negative potential impressed at the same time. This blocks the output of transistor 53.

Accordingly, the same conditions prevail here as in parts 26, 27, 43, and 44 of the circuit shown in FIG. 2. On the other hand, if only photoresistor 19 were illuminated, so that the two photoresistors 19 and 20 would then exhibit different illumination states, no blocking control voltage could be impressed upon transistor 53, since transformer 62 would be deenergized. Hence, incandescent lamp 37 would be energized through the conducting circuits of the two corresponding transistors and indicate the 0–2 zone. This case is shown in FIG. 3 for the transistors 56 and 57 assigned to incandescent lamp 39. The other switching stages of transistors 54 to 60 operate in similar fashion and their circuit elements therefore need not be described in detail.

Figure 4:
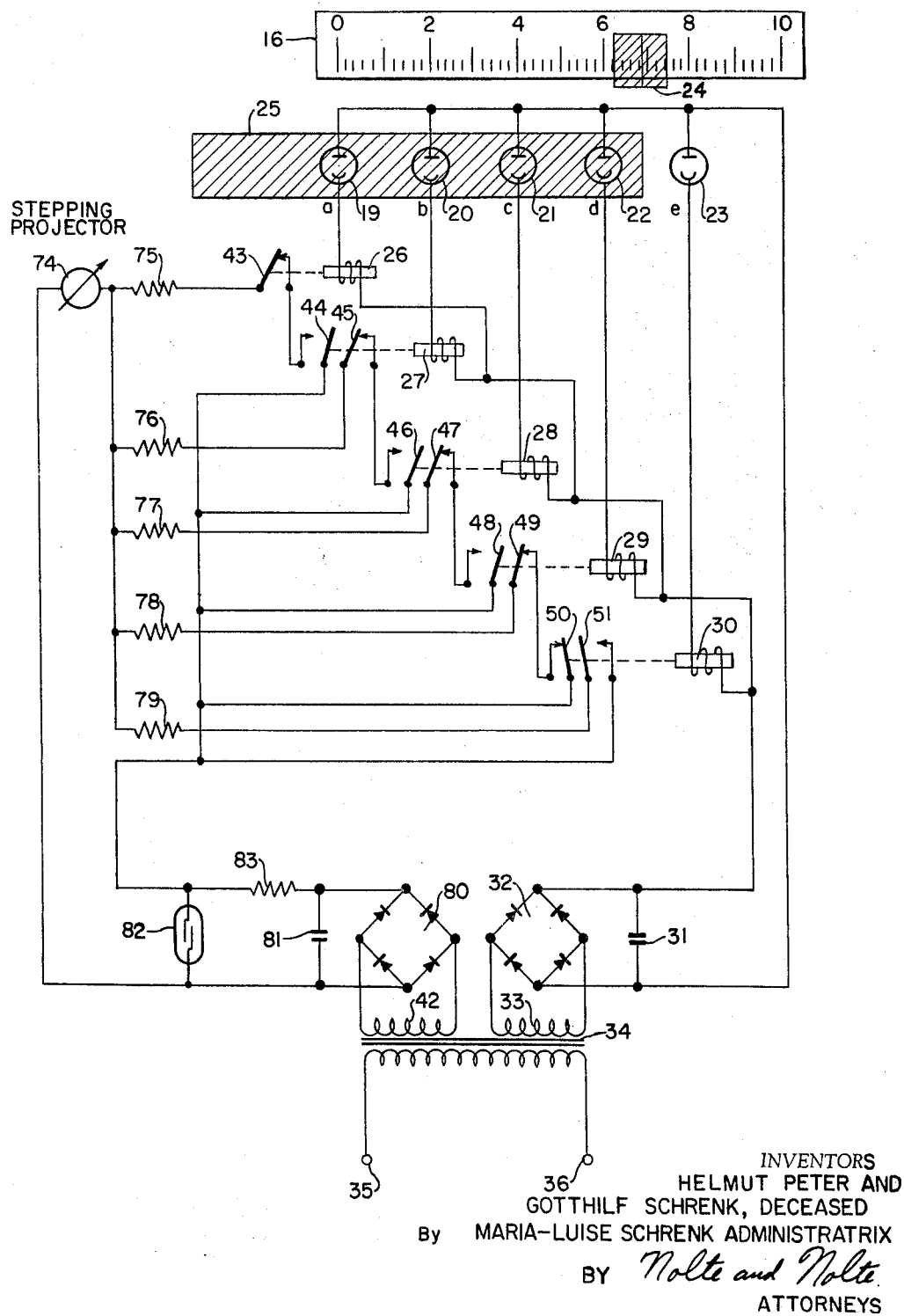
FIG. 4 finally shows an embodiment of the switching device with electromechanical relays and with a large-scale indicating-measuring instrument, which is connected through the relays and other circuit elements to a special source of current.

FIGURE 4 shows an embodiment of the switching device in which a large-scale projection instrument of known type is employed instead of a series of incandescent lamps. In such an instrument a series of numbers is mounted on a moving system for passing before the beam of an optical projection system. In these projection instruments the element on which the numbers are mounted must move step by step, so that only one complete measured value is visible on the projection surface at any one time.

This is secured in the present case by having separate resistors 75 to 79 connected in series with a projection instrument 74 via electromagnetic relay circuits 26–30 and 43–51, built up and denoted as in FIG. 2. These resistors are so dimensioned that projection instrument 74 receives enough current from one step to another for the corresponding figure to appear in full on the projection surface.

The circuit of projection instrument 74 is supplied with direct current through a rectifier 80 and a charging condenser 81, this direct current being kept constant in known manner by a glow lamp 82 and its series resistor 83.

The invention is not confined, of course, to employment for an indicating device. Instead of the latter, elements of an appropriate regulating device can likewise be connected to the circuits. Furthermore, the number of photoresistors can be made as large as desired, being limited only by the mechanical design features of the controlled measuring device.

It will be understood that many changes and modifications may be made therein without departing from the spirit of the invention as defined by the appended claims.

What is claimed is:

1. A photo-responsive switching device for use with a meter movement whose angular displacement is proportional to a variable quantity and indicative of said quantity on an associated scale, comprising a plurality of photo-responsive elements adapted to conduct current therethrough upon illumination by light moveably secured along a path adjacent said scale, the spacing between adjacent elements corresponding to a predetermined range of said scale, means mounted on said meter movement for transmitting an elongated visible beam adapted to travel along said path containing said elements and a marking beam onto said scale, a characteristic line of said marking beam corresponding to the quantity to be measured and travelling in unison with a front edge of said elongated beam, whereby rotation of said meter movement causes said elongated beam to progressively illuminate each of said elements, switching means comprising a normally open and a normally closed switch means serially connected to each of said elements and a source of current for energization upon illumination of said elements by said elongated beam, the arrangement being such that a normally open switch means associated with one element is connected to a normally closed switch means of an adjacent element, and an indicating output means for each of said ranges is connected to said current source through said interconnected normally open and normally closed switch means of the respective adjacent elements, whereby only the indicating output means associated with a range on which said characteristic line of said marking beam is located, is energized.

2. A photo-responsive switching device as claimed in claim 1, wherein each of said switching means comprises an energizing coil connected in series with the associated photo-responsive element and said current source, said normally open and normally closed switch means comprise each a pair of contacts connected for activation by said energizing coil.

3. A photo-responsive switching device as claimed in claim 1, wherein each of said switch means is a semi-conductor switch having a base, an emitter and a collector electrode, said base electrode of each of said semi-conductor switches being connected to the respective one of said photo-sensitive elements for supplying thereto a voltage when said one element is energized, said normally open switch means being biased to non-conduction and said normally closed switch means being biased to conduction, when the associated photo-sensitive element is not energized, the collector electrode of a normally conductive switch associated with one of said photo-sensitive elements being connected to the emitter electrode of a normally non-conductive switch associated with an adjacent one of said photo-sensitive elements, and said indicating output means being connected in series with said interconnected collector and emitter electrodes and said current source.

References Cited by the Examiner
UNITED STATES PATENTS

| | | | |
|---|---|---|---|
| 2,085,671 | 6/1937 | Powers | 317—127 X |
| 2,329,715 | 9/1943 | Grier | 340—266 |
| 2,415,175 | 2/1947 | Hurley | 317—127 X |
| 2,420,159 | 5/1947 | Wineman | 250—230 X |

WALTER L. CARLSON, *Primary Examiner.*

R. V. ROLINEC, *Assistant Examiner.*